United States Patent [19]

Pitts

[11] Patent Number: 4,850,190
[45] Date of Patent: Jul. 25, 1989

[54] SUBMERGED OCEAN CURRENT ELECTRICAL GENERATOR AND METHOD FOR HYDROGEN PRODUCTION

[76] Inventor: Thomas H. Pitts, 312 Hillside, Anderson, S.C. 29621

[21] Appl. No.: 191,569

[22] Filed: May 9, 1988

[51] Int. Cl.$^4$ .............................................. F03B 13/10
[52] U.S. Cl. ....................................... 60/398; 60/495; 290/53; 290/54
[58] Field of Search .................. 60/398, 495, 497–507; 290/53, 54

[56] References Cited

U.S. PATENT DOCUMENTS

| | | | |
|---|---|---|---|
| 1,502,511 | 7/1924 | Marvin | 60/501 |
| 2,501,696 | 3/1950 | Souczek | 290/43 |
| 4,383,182 | 5/1983 | Bowley | 290/54 X |
| 4,520,273 | 5/1985 | Rowe | 290/54 |
| 4,748,808 | 6/1988 | Hill | 290/54 X |

Primary Examiner—Allen M. Ostrager
Attorney, Agent, or Firm—Cort Flint

[57] ABSTRACT

A system and method for generating chemical energy from ocean current energy is disclosed which includes a unique suspension system having a support cable (10) submerged below the ocean surface in an isolation zone (Z) remote from the adverse influences of storms and hurricanes. Support cable (10) is submerged by a first anchor which includes guys (20), buoyancy chambers (30) and guy anchors (22). A second anchor is provided by generator cable assemblies (B) which suspend a plurality of electric energy generating units (A) and are anchored by means of suspension anchors (52). Buoyancy provided by modules (14,30,36) exert a buoyancy on the suspension system and provides that the basic components of the suspension system essentially support their own weight. In this manner, little or no weight is exerted on support cable (10) by the anchors and generating units suspended. Preferably, generating units (A) are arranged in a matrix of vertical and horizontal rows across the width and along the depth of the ocean current. Generating units (A) are suspended by means of swivels and include stabilizer (68) so that they turn with the current. For example, in the Gulf Stream, the upper generating units (A) may be pointed in one direction of maximum current impact, while the lower generating units (A) are turned in an opposite direction since the North and South currents run counter to each other.

24 Claims, 3 Drawing Sheets

4,850,190

SUBMERGED OCEAN CURRENT ELECTRICAL GENERATOR AND METHOD FOR HYDROGEN PRODUCTION

BACKGROUND OF THE INVENTION

The invention relates to converting ocean current energy into electrical energy and then converting the electrical energy into chemical energy by decomposition of water into its basic elements by means of electrolysis in situ.

There is no pollution in the production of hydrogen or the burning of hydrogen in the presence of oxygen. The only residue is water. To activate a transition from conventional energy sources to a hydrogen based energy source, a dependable, abundant, domestic and inexpensive supply of hydrogen is needed. However, this need creates problems to which considerable attention need be given.

Attempts have been made to harness the energy of the ocean to produce hydrogen through electrolysis. For example, see U.S. Pat. Nos. 4,490,232; 4,443,708; 4,384,212; 4,357,543; 4,122,676; and 817,317. However, these patents generally are directed to using the in and out motions of the tide or the undulating motions of waves to generate the electrical energy needed for electrolysis. The motive elements of these systems involve mechanisms exposed at or above the level of the water. This makes the systems and processes highly susceptible to hurricanes, storms, and other detrimental weather conditions occurring at sea. Reliable operation of the systems and processes is highly questionable and problematic to the point of rendering them impractical.

Accordingly, an important object of the invention is to provide a practical, inexpensive system and method for producing massive amounts of hydrogen, oxygen, and other chemicals by using ocean current energy as power for the decomposition of water.

Still another object of the invention is to produce massive amounts of hydrogen, oxygen and other chemicals by using structure submerged beneath the surface of the ocean so that they are protected against detrimental weather conditions.

Another object of the invention is to provide a system and method for producing hydrogen and other chemicals using ocean current energy without the need for rigid structural steel and concrete structure.

Still another object of the invention is to provide an underwater system and method for producing hydrogen and other chemicals from ocean current energy wherein structural weight limitations are neutralized by basic components which support their own weight by virtue of buoyancy modules located strategically in the system.

Another object of the invention is to provide a system and method for producing hydrogen by using ocean current energy which is safe from damage by storms or hurricanes because it is below their zones of influence.

Another object of the invention is to provide a system and method for producing hydrogen from ocean current energy of the Gulf Stream which takes advantage of the north and south flowing counter currents as well as of directional currents at varying depths of the Gulf Stream.

Still another object of the invention is to produce hydrogen and other chemicals from ocean current energy by deploying a system which is submerged under the water for safety and wherein repairs, replacements, or preventative maintenance can be conducted from above the surface of the ocean without the need of submersible vessels by employing a unique suspension and cable system.

Another object of the invention is to provide a system and method for producing hydrogen and other chemicals from ocean current energy which utilizes commercially available equipment and does not require exotic or theoretical equipment.

Still another object of the invention is to provide an underwater system and method for producing hydrogen and other chemicals from ocean energy currents in which a combination of a vertical stabilizer and swivel maintained through a unique anchor system keeps the propeller of an electrical generating unit pointed optimally into the ocean current regardless of current shifts for maximum energy production.

SUMMARY OF THE INVENTION

The above objectives are accomplished according to the invention by utilizing energy from ocean currents such as found in the Gulf Stream. The Gulf Stream obtains speeds up to seven miles per hour as it follows the United States coast to Cape Haters, N.C., and then bears to a more easterly direction. The volume of water injected into the Atlantic Ocean is about one-quarter mile deep and about forty five miles wide. There are many other currents of the world oceans such as the California current and the Alaska current. In accordance with the invention, a number of electric power generating units are submerged in the Gulf Stream for generating electrical power. The generating units are stabilized to point into maximum ocean current flow and submerged by means of a unique suspension system wherein buoyancy modules are strategically placed so that basic system components support their own weight. The electrical power is delivered to one of the decomposition chambers wherein hydrogen and other chemicals are produced. The hydrogen is stored in the surface container which may be accessed by ships or barges for transportation to shore.

DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

Figure 1:
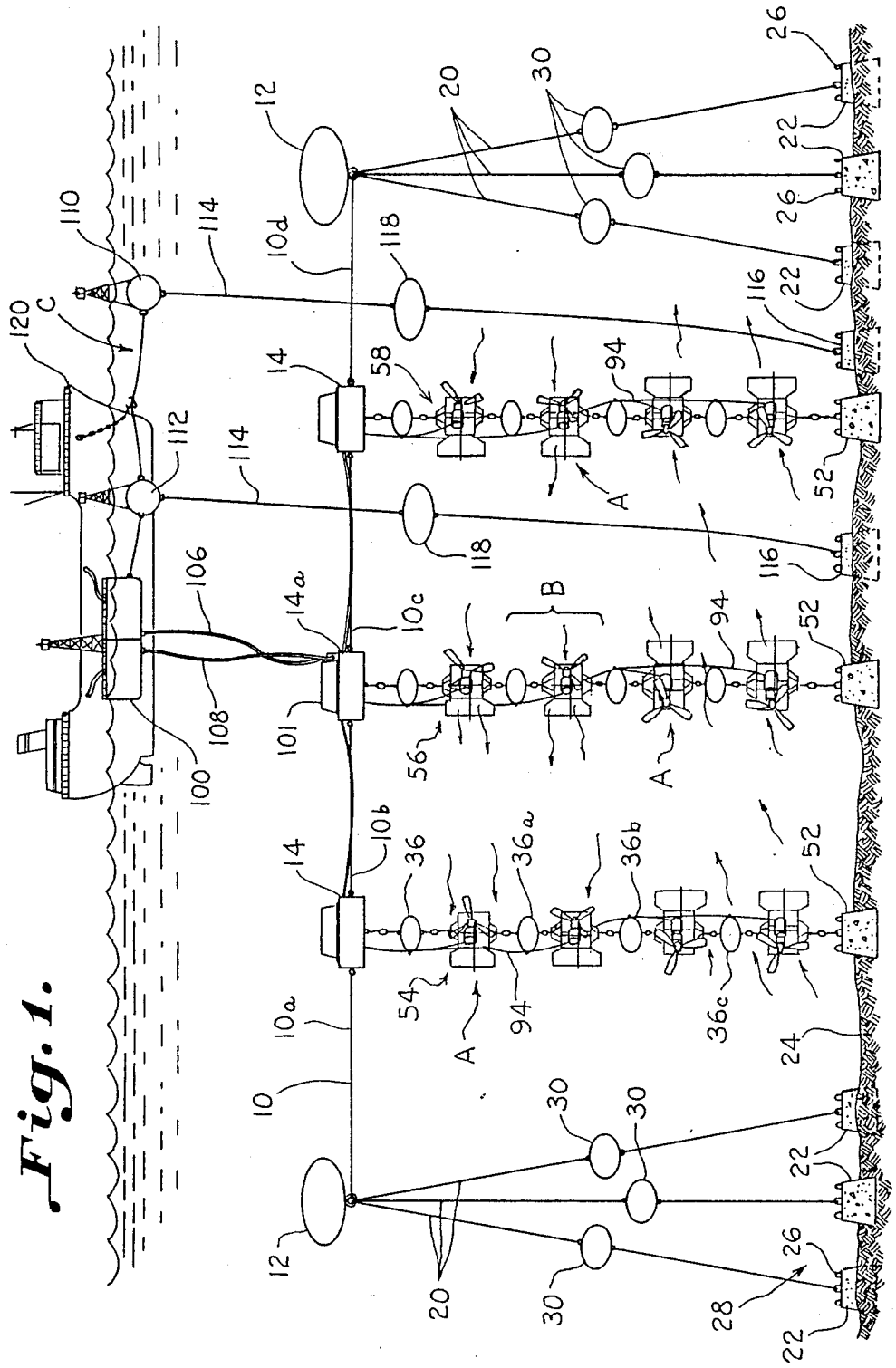
FIG. 1 is an elevation illustrating the system and method according to the invention for producing hydrogen and other chemicals from ocean current energy.

While the system and method are applicable to ocean currents around the world, the Gulf Streams currents are described for purposes of illustration only, and not limitation. Referring now in more detail to the drawings, means for submerging and suspending the system includes a submerged suspension system having support means in the form of a generally horizontal support cable 10 suspended parallel to the surface of the ocean in an East, West attitude since the Gulf Stream flows from South to North. Support cable 10 is supported by support buoyancy means in the form of floatation modules 12 at the ends of the cable and intermediate floatation chambers 14 between the ends of the cable. Support cable 10 includes a first section 10a, a second section 10b, a third section 10c, and a fourth section 10d, as can best be seen in FIG. 1. The flotation modules and chambers for support cable 10 are preferably large, buoyant modules which can also serve as workshops, decomposition chambers, crew quarters, compression rooms, and other purposes. Support cable 10 is about eleven thousand feet long, which may vary, and is suspended a distance "Z" below the surface of the ocean at an isolation zone below the influence of detrimental weather like storms and hurricanes.

Figure 3:
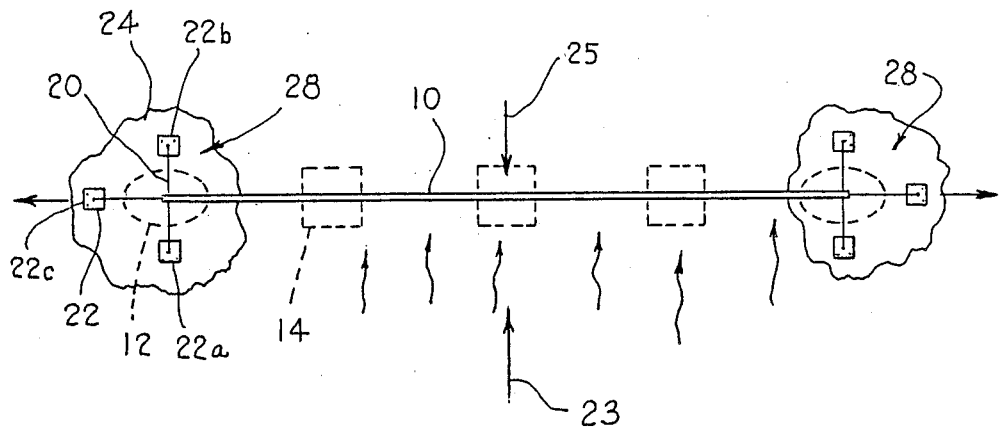
FIG. 3 is a schematic view of an anchor system for the main transverse support cable of the invention.

Guy means for anchoring support cable 10 includes a plurality of flexible guys 20 attached to the end buoyancy modules 12. The ends of guys 20 are secured to one of three anchor eyes in each anchor position 22. A sufficient number of preformed concrete units will be ganged together by cable and will lay on the ocean floor 24. As can best be seen in FIG. 3, anchors 22 are spaced in three locations in a triangular formation of the three guys 20 which prevents movement of support cable 10 in any direction. Anchors 22 may be made of precast cement or quarried stone. Each anchor may be covered with a waterproof plastic coating or sealant. Each anchor has three anchor eyes 26. Each guy 20 is attached to a specific anchor arranged to prevent support cable 10 from moving. Anchors 22a and 22b anchor against movement in opposing directions of current flow shown by arrows 23 and 25. Anchor 22c anchors cable 10 in tension. The anchors may be provided with holes or other attachments to accommodate a cable or other holding unit to tie all of the anchors together in any given anchor site such as anchor site designated generally as 28. Guy buoyancy means comprises buoyancy modules 30 connected to guys 20. Buoyancy modules 30 are attached to the guys at appropriate intervals along their lengths. The size of the buoyancy modules will be sufficient to support the weight of the guy below the module and give a slight positive buoyancy. The buoyancy modules will prevent sag in the guys and will eliminate the sag of the guys pulling down on the support cable. First anchor means for anchoring the suspension system is provided by guys 20, guy anchor means 22, and guy buoyancy means 30.

All guys and suspension cables may be equipped with a releasable anchor mechanism (not shown) so that they may be brought above the ocean surface for repairs. Smaller pilot cables may be attached to the ends of the suspension cables and guys. When the guys or support cables are released and brought top side, the pilot cable will follow. When replacing the guy or suspension cable, the pilot cable will guide the expandable/ contractible anchor device (not shown) back through the anchor eye. A light cable may be passed through the second and third anchor eyes of the anchors and both ends of the light cable will be secured top side. The purpose of the light cables is to provide for installing a temporary guy prior to releasing a main guy to be brought top side. In addition, the light cable will keep enough tension on the temporary guy to prevent current from washing the temporary guy into the propellers of neighboring generating units A.

Suspended between support cable 10 and the ocean floor is electric energy generating means for generating electric energy consisting of a plurality of electric energy generating units, designated generally as A. Generating units A are disposed vertically along the depth of the Gulf Stream and horizontally across the Gulf Stream, for example, as can best be seen in FIG. 1. As can best be seen in FIG. 2, one of the electric power generating units A will be described in detail. Suspended from support buoyancy means 14, which may be a main water decomposition chamber 14a, is a generator suspension assembly B which includes a number of components attached to suspension cable 34. Suspension assembly B includes a suspension buoyancy means in the form of a suspension buoyancy module 36 attached to suspension cable 34. There is a short suspension cable 38 which is attached to a swivel means 40 which may be any standard swivel connector. A short suspension cable 42 connects swivel 40 to a top attachment assembly 44 of generator cage 46. A bottom attachment assembly 48 of generator cage 46 is attached to connector cable 50 which is attached to a second swivel means 40. The top and bottom attachment assemblies include cables 49 which yield to accommodate undulations in the ocean current to provide horizontal stabilizer means. Finally, swivel means 40 may be attached to the buoyancy means 36a of the next adjacent assembly B below through cable 34. Any number of suspension assemblies B may be utilized until a desired number of generating units A is vertically suspended between support cable 10 and a generator suspension anchor means 52 anchored in ocean floor 24. Thus, a second anchor means for anchoring support means 10 and generating units A includes suspension cable assemblies B connected to support means 10 and suspension anchor means 52. Steel buoyancy module 36 will be provided in number or size to support the weight of the electric generator unit A and all related hardware components located between its bottom and the top of the next buoyancy module 36 below. It is preferred that the buoyancy module give about one hundred pounds of positive lift upwards.

As can be seen in FIG. 1, there are four electric energy generating units connected between support cable 10 and generator anchor 52 in three complete vertical rows. The three vertical rows are designated generally as 54,56,58 of generator units A so described. The attached vertical rows described, also constitute lateral rows of generator units which are not attached as can be viewed, for example, from left to right. By disposing the generating units in a matrix consisting of vertical and horizontal rows of spaced generator units, the energy generating capability of the ocean currents in the Gulf Stream can be optimally utilized along its depth and across its width.

Figure 2:
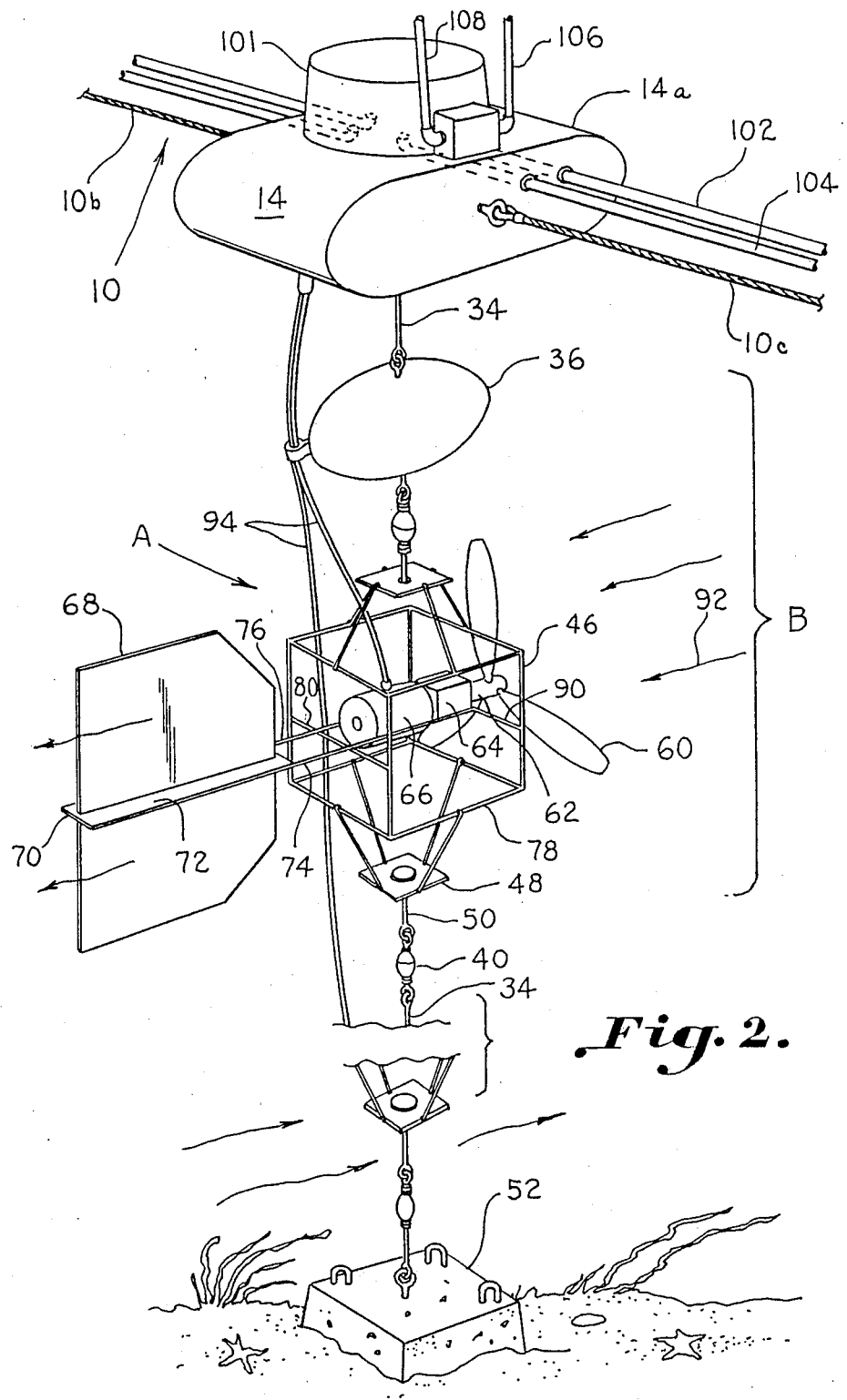
FIG. 2 is a perspective view of a submerged, electric power generating unit for use in the system and method of the invention.

As can best be seen in FIG. 2, each power generating unit A consists of a propeller 60, a propeller shaft 62, and a gear box 64 which receives the shaft 62 of propeller 60 in driving relation. The gear arrangement in gear box 64 is connected to an input generator shaft (not shown) of generator 66. A vertical stabilizer 68 is carried by a mounting assembly 70 which includes a plate 72 in which stabilizer 68 is affixed, such as by welding. Mounting assembly plate 72 is attached to a pair of elongated struts 74 and 76. Generator mounting cage 46 comprises a framework box 78. A pair of cross struts 80 and 90 are attached to struts 74 and 76. The housing of generator 66 and gear box 64 are attached to struts 74,76 by any suitable manner such as welding. Vertical stabilizer 68 points the propellers in the optimal direction to the ocean currents in the Gulf Stream denoted by arrows 92. The Gulf Stream flows from South to North, but there is a counter current below the Gulf Stream and it flows North to South. The present invention requires that a series of generating units A be suspended one below the other on the same suspension cable from about two hundred feet below the surface of the ocean to about two hundred feet above the ocean floor. Some of these generating units may be powered by the North flowing Gulf Stream and some may be pointed in a generally opposite direction and be powered by the counter current. This also serves to nullify opposing forces on support means 10.

The vertical stabilizer may be welded to the vertical stabilizer mounting assembly in a vertical position. The stabilizer may be made of sheet metal. The surface area of the vertical stabilizer will be greater than the surface area of the propeller. This will cause the vertical stabilizer to swivel the entire electric generator unit A and will keep the propeller pointed directly into the strongest flow of water current. The generator 66 may be any conventional generator structurally reinforced to withstand the pressures and rigors of the ocean environment. The ocean current impinges on the propeller blades 60 and the propeller rotates the propeller shaft connected to gear box 64. The gear box increases the RPM to optimum operating speeds of generator 66. The generator shaft is connected to the output end of the gear box. Generator 66 converts the mechanical energy into electrical energy and transmits via transmission line 94 to the water decomposition tank 14 above the generator string at the suspension cable.

Figure 4:
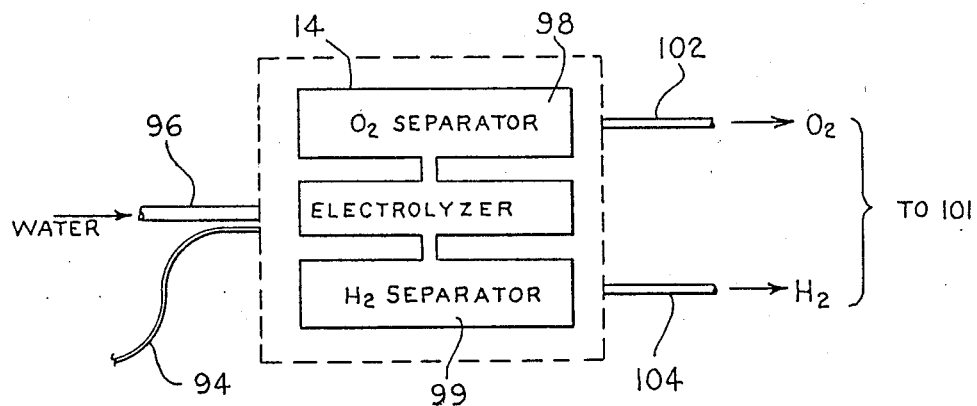
FIG. 4 is a schematic diagram of a water decomposition chamber according to the invention.

Any suitable conventional chemical energy conversion process may be utilized. As can best be seen in FIG. 4, a typical water decomposition process is illustrated for water decomposition chamber 14. Water hydrogen and oxygen. Oxygen is separated in separator 98 and is collected and deposited in storage container 100 floating on the surface of the ocean via lines 102 and 106. Hydrogen is separated in separator 99 and delivered via line 104 and 108 to storage container 100. Lines 102 and 104 go first from each decomposition chamber 14 to a manifold 101 of main decomposition chamber 14a. Manifold 101 delivers hydrogen through line 106 and oxygen through line 108 to storage container 100 where the hydrogen and oxygen are stored. A mooring system designated generally as C includes a pair of mooring buoys 110,112 which are attached by means of mooring cables 114 to mooring anchors 116. Buoyancy modules 118 support the weight of the cable below the module. A tanker vessels 120 may dock or moor at mooring system C while taking on hydrogen and oxygen from storage container 100.

The hydrogen and oxygen may be compressed and deposited in their respective receptacles. The receptacles may be towed to a disposition point on shore for final disposition. Alternately, the vessel 120 or light barges may be used to off-load the hydrogen and oxygen and transport it near shore. The ocean water may be modified in its salt content depending on the type chemical energy being produced. In the case of hydrogen, a desalination process may be used to modify the salt content prior to entering the chemical conversion unit.

It is noted that with regards to how many strings of generator units A are suspended from support cable 10, there will be no weight pulling down on the support cable.

While a preferred embodiment of the invention has been described using specific terms, such description is for illustrative purposes only, and it is to be understood that changes and variations may be made without departing from the spirit or scope of the following claims.

What is claimed is:

1. A system for producing chemical energy from ocean current energy below the surface of the ocean removed from the influence of detrimental weather such as hurricanes, ocean storms, and the like, comprising:

submerged suspension means including generally horizontal support means disposed below and generally parallel to an ocean surface adjacent an isolation zone spaced a distance below said ocean surface which is effectively isolated from detrimental weather occurring above said ocean surface;

first anchor means for anchoring said support means adjacent said isolation zone generally transverse to said ocean current;

electric energy generating means suspended by said suspension means below said zone connected to said support means;

second anchor means for anchoring said generating means in said suspension means to an ocean floor;

motive means included in said generating means for being acted upon by said ocean current flowing in the ocean causing electric energy to be generated by said generating means;

stabilizer means for pointing said motive means in an optimal direction for maximum ocean current impact and maximum generation of electric energy from said ocean current;

swivel means included in said suspension means for suspending said generating means by said support means in such a manner that said motive means swivels in said ocean current in response to said stabilizer means for pointing said motive means in said optimal direction; and chemical conversion means receiving said electrical energy from said generating means for decomposing ocean water into said chemical energy.

2. The system of claim 1 wherein said first anchor means includes:

guy means attached to opposing ends of said support means; and guy anchor means connected to said guy means for anchoring the ends of said guy means at first and second spaced locations on said ocean floor to oppose movement of said support means in a first direction in the direction of said ocean current and a second direction opposite to said first direction.

3. The system of claim 2 wherein said guy means includes a generally flexible support cable and said guy anchor means includes a third location for anchoring said support cable placing said opposing ends in tension.

4. The system of claim 1 wherein said electric energy generator means comprises a plurality of individual, electric energy generating unit carried by said suspension system each being independently swiveled by said swivel means and positioned by said stabilizer means; and said individual generating units being carried by said suspension means in a matrix arrangement of generally vertical and horizontal rows of said generating units for impact by said ocean current at varying directions across the width and along the depth of said ocean current.

5. The system of claim 1 wherein said motive means includes a propeller having a plurality of blades;
said stabilizer means includes a generally vertical stabilizer plate; and
said stabilizer plate having a surface area greater than the surface area of said blades of said propeller.

6. The system of claim 1 including buoyancy means carried by said suspension means for exerting a buoyant force on said suspension means in a manner that said support means is buoyant in said submerged position, and said first and second anchor means exert a minimum weight on said support means.

7. The system of claim 6 wherein said buoyancy means includes a plurality of buoyancy chambers attached to said support means for exerting a buoyant force on said support means, and said buoyancy chambers house said chemical conversion means which include decomposition chambers for decomposing said water.

8. The system of claim 1 wherein said second anchor means comprises:
a generator suspension cable assembly for suspending and swiveling said generating means; and
generator anchor means laying on said ocean floor for anchoring said suspension cable assembly and generating means to said ocean floor.

9. The system of claim 1 including:
mooring means anchored to said ocean floor for the mooring of an ocean going vessel; and
buoyant storage means floating within the ocean connected to said chemical conversion means for storing hydrogen and adapted for fluid communication with said ocean going vessel for loading of said chemical energy onto said vessel.

10. A system for producing chemical energy from ocean current energy below a surface of the ocean removed from the influence of detrimental weather such as hurricanes, ocean storms, and the like, comprising:
electric energy generating means having a motive means acted upon by said ocean currents below said ocean surface for causing electrical energy to be generated by said generating means;
suspension means submerged in the ocean below said ocean surface at an isolation zone effectively isolated from the effects of said detrimental weather above said ocean surface for suspending said electric energy generating means in a suspended position in said ocean current below said isolation zone;
anchor means for anchoring said suspension means and electric energy generating means generally transverse to said ocean current below said isolation zone and above said ocean floor; and
chemical energy conversion means receiving electric energy from said generating means for generating chemical energy from said electric energy by the decomposition of water.

11. The system of claim 10 wherein said suspension means includes:
generally horizontal support means disposed generally parallel to said ocean surface and submerged adjacent said isolation zone;
buoyancy means included in said suspension means for exerting a buoyant force on said suspension means and maintaining said suspension means buoyant while submerged and anchored to said ocean floor by said anchor means; and
support buoyancy means included in said buoyancy means for exerting an upward force on said support means for supporting said support means in said submerged generally parallel position relative to said ocean surface.

12. The system of claim 11 wherein said anchor means includes:
first anchor means having guy means connected to opposing ends of said support means and along its length as required;
guy anchor means anchoring said guy means to an ocean floor at spaced locations in a manner to oppose movement of said support means in a first direction in the direction of said ocean current and in a second direction opposite to said first direction; and
said guy anchor means further anchoring said guy means to place said support means in tension.

13. The system of claim 11 wherein said buoyancy means includes guy buoyancy means for exerting a buoyancy force on said guy means so that said guy means does not impose weight on said support means.

14. The system of claim 13 wherein said support buoyancy means includes buoyancy chambers which serve to exert said buoyant force on said support means and also serve as water decomposition chambers for said chemical conversion means and the conversion of said electrical energy to said chemical energy.

15. The system of claim 10 including:
said electric energy generating means including a plurality of individual generating units;
said suspension means includes generator suspension means suspending said plurality of generator units in a matrix of horizontal and vertical rows of said generating units along a prescribed depth and across a prescribed width of said ocean current.

16. The system of claim 15 wherein said generator suspension means includes:
a plurality of generator suspension assemblies interconnected to suspend a plurality of said generating units in a vertical row, each said generator suspension assembly generally supporting its own weight in said suspension means and includes:
suspension buoyancy means;
first swivel means connected between said suspension buoyancy means and to a generating unit;
second swivel means connected between said generating unit and to the suspension buoyancy means of a next adjacent suspension cable assembly vertically below; and
a suspension anchor means laying on the ocean floor and connected to a the last one of said suspension cable assemblies.

17. The system of claim 16 including a plurality of said suspension cable assemblies suspended vertically from said support means and spaced laterally across said ocean current to form said matrix of generating units.

18. A system for producing chemical energy from ocean current energy below a surface of the ocean removed from the influence of detrimental weather such as hurricanes, ocean storms, and the like, comprising:
an electric energy generating unit for generating electric energy;
suspension means for suspending said electric energy generating unit submerged in the ocean below said ocean surface at an isolation zone effectively isolated from the effects of said detrimental weather above said ocean surface, and generally transverse to said ocean current;

a top attachment assembly carried by said generating unit, and a bottom attachment assembly carried by said generating unit;

first swivel means connecting said top attachment assembly in said suspension means;

second swivel means connected said bottom attachment assembly in said suspension system;

motive means included in said generating unit for being acted upon by said ocean current for causing said electric energy to be generated;

stabilizer means pointing said motive means in a direction for maximum impact with said ocean current to maximize movement of said motive means and the amount of electric energy generated by said generating unit;

suspension buoyancy means buoyantly carrying said first swivel means, generating unit, and second swivel means disposed adjacently below;

suspension cable means connecting said suspension buoyancy means in said suspension assembly; and generator anchor means anchoring said suspension cable means and said generating unit to an ocean floor.

19. The system of claim 18 wherein said motive means includes a propeller having a plurality of blades and said stabilizer includes a vertical plate carried by said generating unit.

20. The system of claim 19 wherein said stabilizer plate has a surface area greater than the surface area of the blades of said propeller.

21. The system of claim 18 including a plurality of generating units carried in a matrix by said suspension means in vertical and horizontal rows across the width and along a depth of said ocean current.

22. A method of producing chemical energy from ocean current energy comprising:

anchoring a submerged support means generally parallel to said ocean surface a distance below said ocean surface in an isolation zone removed from the influence of detrimental weather above said ocean surface and transverse to said ocean current;

suspending a number of electric energy generating units from said support means in said ocean current;

anchoring said electric energy generating units to an ocean floor so that said ocean current impacts said generating units to cause said units to generate electric power;

suspending said generator units from said support means by using buoyancy modules so that the weight of said generating units is exerted on said support means is eliminated; and converting said electrical energy into chemical energy by the decomposition of water.

23. The method of claim 22 including: submerging and suspending said support means in said ocean by attaching buoyancy modules to said support means; and anchoring said support means to the ocean floor in such a manner forces on said support means are opposed in opposing directions of said ocean current to prevent movement of said support means.

24. The method of claim 22 including:

suspending said generating units in a matrix comprising vertical and horizontal rows of said generating units across the width and along the depth of said ocean current; and swiveling said generating units in said matrix about generally vertical axes so that a flow of said ocean current in a first direction impacts on a first plurality of said generating units and said ocean current impacts on a second plurality of said power generating units while flowing in an opposite, second direction so that forces on said support cable tend to be neutralized.

* * * * *